US005905876A

United States Patent [19]

Pawlowski et al.

[11] Patent Number: 5,905,876

[45] Date of Patent: May 18, 1999

[54] QUEUE ORDERING FOR MEMORY AND I/O TRANSACTIONS IN A MULTIPLE CONCURRENT TRANSACTION COMPUTER SYSTEM

[75] Inventors: Stephen S. Pawlowski, Beaverton; Peter D. MacWilliams, Aloha; D. Michael Bell, Beaverton, all of Oreg.

[73] Assignee: Intel Corporation, Santa Clara, Calif.

[21] Appl. No.: 08/766,954

[22] Filed: Dec. 16, 1996

[51] Int. Cl.[6] .......... G06F 13/14

[52] U.S. Cl. .......... 395/292; 395/287; 395/309; 395/310; 711/117; 711/118; 711/141; 711/142; 711/143; 711/146

[58] Field of Search .......... 711/117–118, 141–143, 711/146; 395/309, 287, 292, 310; 364/229.2

[56] References Cited

U.S. PATENT DOCUMENTS

| | | | |
|---|---|---|---|
| 5,386,517 | 1/1995 | Sheth et al. | 395/880 |
| 5,535,340 | 7/1996 | Bell et al. | 395/292 |
| 5,546,546 | 8/1996 | Bell et al. | 395/292 |
| 5,611,058 | 3/1997 | Moore et al. | 395/309 |
| 5,623,628 | 4/1997 | Brayton et al. | 711/141 |
| 5,634,015 | 5/1997 | Chang et al. | 395/309 |
| 5,684,977 | 11/1997 | Van Loo et al. | 711/143 |
| 5,694,556 | 12/1997 | Neal et al. | 395/308 |
| 5,696,910 | 12/1997 | Pawlowski | 395/280 |
| 5,764,934 | 6/1998 | Fisch et al. | 395/309 |
| 5,812,803 | 9/1998 | Pawlowski et al. | 395/309 |
| 5,832,241 | 11/1998 | Guy et al. | 395/292 |
| 5,835,783 | 11/1998 | Grimsrud | 395/828 |

*Primary Examiner*—John W. Cabeca
*Assistant Examiner*—Denise Tran
*Attorney, Agent, or Firm*—Kenyon & Kenyon

[57] ABSTRACT

A transaction ordering mechanism for processor-based computing systems ensures proper ordering of transactions between the processor, I/O and memory subsystems, ensures cache coherence within the computing system, and facilitates concurrence of the transactions so as to enable high-bandwidth, deadlock-free operation. I/O to memory transactions and processor to memory transactions are placed in a memory request queue in the order in which such transactions appear on the processor bus; I/O to memory transactions are placed in an inbound request queue in the order such transactions appear on the I/O bus; and processor to I/O transactions and completions corresponding to split-transaction I/O to memory read transactions are placed in an outbound request queue in the order in which the split-transaction I/O to memory read transactions and the processor to I/O transactions appear on the processor bus.

15 Claims, 2 Drawing Sheets

QUEUE ORDERING FOR MEMORY AND I/O TRANSACTIONS IN A MULTIPLE CONCURRENT TRANSACTION COMPUTER SYSTEM

FIELD OF THE INVENTION

The present invention relates generally to processor-based computing systems, and more particularly to an I/O system to memory system interface in a multiple concurrent transaction computing system which assures proper ordering of I/O to memory transactions relative to CPU to memory transactions and CPU to I/O transactions.

BACKGROUND INFORMATION

Recently-developed processor-based computing systems, with high bandwidth, deeply-pipelined, split-transaction bus structures, allow for multiple concurrent transactions between the I/O, memory and processor (CPU) subsystems. In order to take advantage of the higher performance such systems can provide while maintaining data correctness throughout the system, proper ordering of the various transactions must be ensured so that I/O system transactions to memory are executed in the proper sequence as compared with CPU transactions to the same memory and CPU transactions to the I/O system.

To illustrate the potential problems that improper transaction ordering can cause, consider, as an example, the following sequence of transactions: (1) a processor initiates a data write to I/O; (2) the processor then initiates a write of a semaphore, or status bit, to memory, indicating that the I/O data write has occurred; and (3) an I/O device initiates a read to the memory to fetch the semaphore to determine whether the write from the processor to I/O has been completed. If the first transaction, i.e., the processor write to I/O, is placed in a queue containing transactions destined for I/O, and if the delay in execution of the write transaction (i.e., the delay in the time it takes the write to reach the head of the queue and thus be processed) is sufficiently long, then it is possible that transactions (2) and (3) could be executed before transaction (1), i.e., the processor write of the semaphore to memory and the subsequent I/O read of memory to check the value of the semaphore could occur prior to the processor write to I/O. If so, then the I/O device inquiring into the semaphore will receive erroneous status information indicating that the data write to I/O has been completed, when it has not.

To avoid this erroneous potential result, in prior art processor-based computing systems, placement of any memory reads initiated by I/O into the "inbound" transaction queue, i.e., the queue containing transactions initiated by I/O and targeted at memory, is delayed until all write transactions in the "outbound" queue, i.e., the queue containing transactions initiated by the processor and targeted at I/O, are completed. This is necessary in such systems because there is no way to determine whether any of the as-yet-unexecuted outbound writes are "related" to the inbound read (i.e., may affect the accuracy of what is about to be read). Thus, in prior art systems, the assumption must be made that the outbound writes are potentially related to the inbound read, and thus the read cannot be performed until any previously-initiated writes are completed. This ensures that the result returned from the read accurately represent the current state of affairs in the system.

Delaying execution of the inbound read, however, diminishes the concurrence capability of these advanced processor-based computing systems. If placement of the read transaction into the inbound queue must be delayed until all outbound writes are completed, then placement in the inbound queue of any other transactions that I/O attempts to initiate following the read must also be delayed. Concurrence is further diminished in many prior art systems in that, while the inbound read transaction is being processed, no further outbound transactions can be placed into the outbound queue.

In addition to proper transaction ordering, cache coherence must also be taken into account in an I/O to memory system interface. Because the memory locations that will be read from or written to by an I/O device typically will be cached in the computing system's processor or processors, it is necessary that the I/O transactions targeted at memory be made visible to the cache(s) inside the processor(s), so that system-wide cache coherence can be maintained.

It is desired, then, to provide a transaction ordering capability for a processor-based computing system which allows for greater transaction concurrence than prior art computing systems - - - thereby providing higher bandwidth transaction processing - - - while maintaining data correctness and cache coherence within the computing system.

SUMMARY OF THE INVENTION

Embodiments of the present invention provide a transaction ordering mechanism for processor-based computing systems which ensures proper ordering of transactions between the processor, I/O and memory subsystems, ensures cache coherence within the system, and facilitates concurrence of the transactions so as to enable a high-bandwidth, deadlock-free computer system. According to an embodiment of the present invention, I/O to memory transactions and processor to memory transactions are placed in a memory request queue in the order in which such transactions appear on the processor bus; I/O to memory transactions are placed in an inbound request queue in the order such transactions appear on the I/O bus; and processor to I/O transactions and completions corresponding to split-transaction I/O to memory read transactions are placed in an outbound request queue in the order the split-transaction I/O to memory read transactions and the processor to I/O transactions appear on the processor bus.

DETAILED DESCRIPTION OF THE INVENTION

Embodiments of the present invention provide a transaction ordering mechanism for processor-based computing systems which ensures proper ordering of transactions between the processor, I/O and memory subsystems, ensures cache coherence within the system, and facilitates concurrence of the transactions so as to enable a high-bandwidth, deadlock-free computer system.

Figure 1:
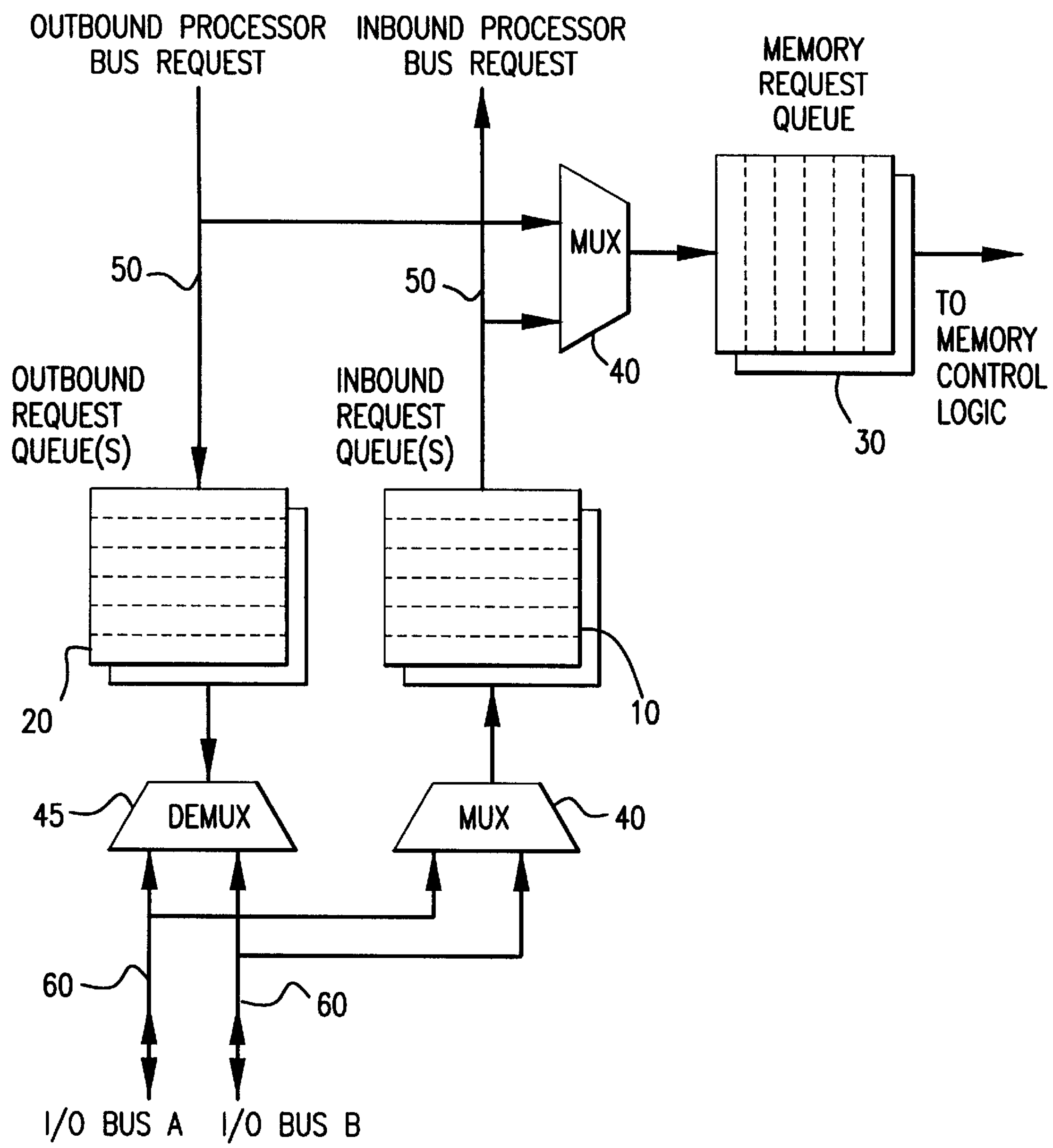
FIG. 1 depicts a transaction flow diagram for performing transaction ordering and maintaining cache coherence according to an embodiment of the present invention.

FIG. 1 depicts a transaction flow diagram for performing transaction ordering according to an embodiment of the present invention. An inbound request queue 10 buffers I/O transactions to memory; an outbound request queue 20 buffers processor transactions to I/O, as well as "completions" for I/O to memory read transactions; and a memory request queue 30 buffers I/O transactions to memory and processor transactions to memory. Multiplexers 40 serialize requests from a processor bus 50 to the memory request queue 30 and from various I/O buses 60 to the inbound request queue 10. In addition, a demultiplexer 45 distributes outbound requests to the appropriate I/O bus 60. The I/O buses 60 can be, for example, peripheral component interconnect (PCI) buses.

According to the illustrated embodiment of the present invention, the ordering of transactions from I/O to memory and from the processor(s) to memory is established by the order that the transactions are observed on the processor bus 50. Because only one transaction can be issued on the processor bus 50 at a time, the multiple,, concurrent transactions destined for the memory request queue 30 from the processor(s) and the inbound request queue 10 are serialized into the queue in the order in which they are issued on the processor bus 50. Subsequent responses to the transactions (such as, e.g., the requested data for a read transaction) are then returned to the processor(s) or I/O system with the proper ordering.

An I/O to memory read transaction, according to the illustrated embodiment of the present invention, is handled as follows. An inbound I/O read transaction is placed in the inbound request queue 10, in the order in which it occurs, relative to other inbound requests, on the I/O bus 60. Transactions within the inbound request queue 10 are handled on a first-in first-out (FIFO) basis. When the inbound read transaction reaches the top of the inbound request queue 10, it requests use of the processor bus 50.

If the computing system is one which is cache coherent, then, once the read transaction is granted use of the processor bus, "snooping" of the transaction by the various cache agents within the processor subsystem is triggered. This snooping can be triggered by, e.g., initiating a "read for ownership" or "zero-length read" on the bus, to alert the cache agents of the main memory read transaction, and thereby maintain cache coherence.

The present invention can be used in systems employing various cache types, such as, e.g., writeback cache or writethrough cache. If writethrough cache is employed in the system, then the main memory location targeted by the read should contain the most up-to-date version of the requested data. If, however, writeback cache is employed, then the main memory version of the targeted data may not be current. In this case, the read transaction is converted to a writeback operation, so that processing of the read request includes delivering to the I/O device initiating the read, as well as to the targeted main memory location, the current version of the data in the corresponding cache line.

While the I/O to memory read transaction has ownership of the processor bus, an I/O "completion" associated with the read transaction is placed into the outbound request queue 20, destined for the I/O bus from which the read operation was initiated. The completion is a token or placeholder which maintains the proper ordering of the read transaction relative to other transactions aimed at the I/O subsystem. A completion ensures system-wide data correctness in processor-based computing systems, such as, e.g., those employing the Intel® Pentium Pro® and/or PCI 2.1-compliant systems, which allow "split transaction" or "delayed transaction" reads. In such systems, read operations are performed in two stages: (1) initiation of the read transaction; and (2) return of the requested data to the device initiating the read. In between the two stages, use of the bus can be granted to other transactions.

Having established the order for the return data for the I/O to memory read relative to any subsequent outbound transactions, the completion travels through the outbound request queue 20 and waits for the return of the requested data from the memory controller. When the data is returned, the memory controller places it in a read data buffer and updates status information within the completion. Once the completion reaches the head of the outbound request queue, if the status information indicates that the requested data has been returned, the completion is forwarded to the I/O bus 60 which requested the data and the I/O system retrieves the data from the read data buffer. If the data has not yet been returned, the completion remains at the head of the outbound request queue 20 until the corresponding read data is ready.

Through the use of delayed transaction reads and the placement of the completion in the outbound queue at the time the read transaction is observed on the processor bus 50, the proper ordering of the inbound read with respect to other transactions in the system is maintained while, at the same time, system concurrence is maintained because processing of other outbound operations are allowed to continue while return of the read data is awaited. The inbound read transaction only causes a delay in the processing of other outbound transactions if the read's completion reaches the head of the outbound request queue 20 before the corresponding read data has been placed in a read data buffer.

A single I/O to memory read transaction may target more than one line of data from the memory. In this case, because snooping occurs on a line-by-line basis on the processor bus 50, the single I/O to memory read transaction in the inbound request queue 10 will, according to an embodiment of the present invention, generate multiple "line reads" from memory, each of which is snooped individually on the processor bus 50 and each of which generates a separate line read transaction in the memory request queue 30. The multiple snoops are performed consecutively (i.e., with no intervening operations) on the processor bus 50. The status information in the corresponding read completion in the outbound request queue 20 is updated to indicate the read data's availability in the read data buffer only when the last of the multiple line reads for a particular I/O to memory read transaction is completed and all of the requested data is in the buffer. In this manner, atomicity of the transaction execution within the system is provided.

An I/O to memory write, according to the illustrated embodiment of the present invention, is handled as follows. The data for the inbound write is placed in a write data buffer for the memory controller and the inbound write transaction is placed in the inbound request queue 10. Once the inbound write transaction reaches the head of the inbound request queue 10, it requests control of the processor bus 50. Once control of the processor bus 50 is granted, a snoop of the write by the cache(s) within the processor(s) can be triggered by e.g., initiating a zero-length read transaction on the processor bus 50. Snooping of the write transaction on the processor bus 50 is used to maintain cache coherence within the system.

If writethrough cache is employed and the targeted memory line is cached (i.e., a cache line "hit" occurs), then the data in any cache lines corresponding to the memory location targeted by the I/O to memory write transaction is invalidated in response to the snoop. If writeback cache is employed and the targeted memory line is cached, then (1) a writeback operation is performed, to ensure the main memory contains the current value of the cache line (in case the I/O to memory write transaction updates only a portion of the cache line data), and (2) any cache copies of that data are invalidated.

Following snooping of the write transaction on the processor bus 50, the write transaction is placed in the memory request queue 30. The memory controller schedules the write into the actual memory array at a later time, but the placement into the memory request queue 30 establishes the order of the write transaction relative to other requests targeting the same memory location. Execution of the transactions in the memory request queue 30 need not necessarily take place on a FIFO basis. For example, for transactions which target different memory array locations, reads can be prioritized over writes, since reads are transactions for which a response is awaited. The time ordering of transactions in the memory request queue 30 is only critical for operations targeting the same memory location.

A processor transaction to I/O, according to the illustrated embodiment of the present invention, is handled as follows. The outbound transaction is placed in the outbound request queue 20 following its request for, and receipt of, control of the processor bus 50. The proper ordering of the outbound transaction relative to completions for inbound writes (which will be placed in the same outbound request queue 20) is thus established. Transactions in the outbound request queue 20 are processed on a FIFO basis in one embodiment of the present invention.

Data buffers for read and write data are preassigned by transaction type, according to one embodiment of the present invention, so that the potential deadlock which can result from shared buffers is avoided.

Figure 2:
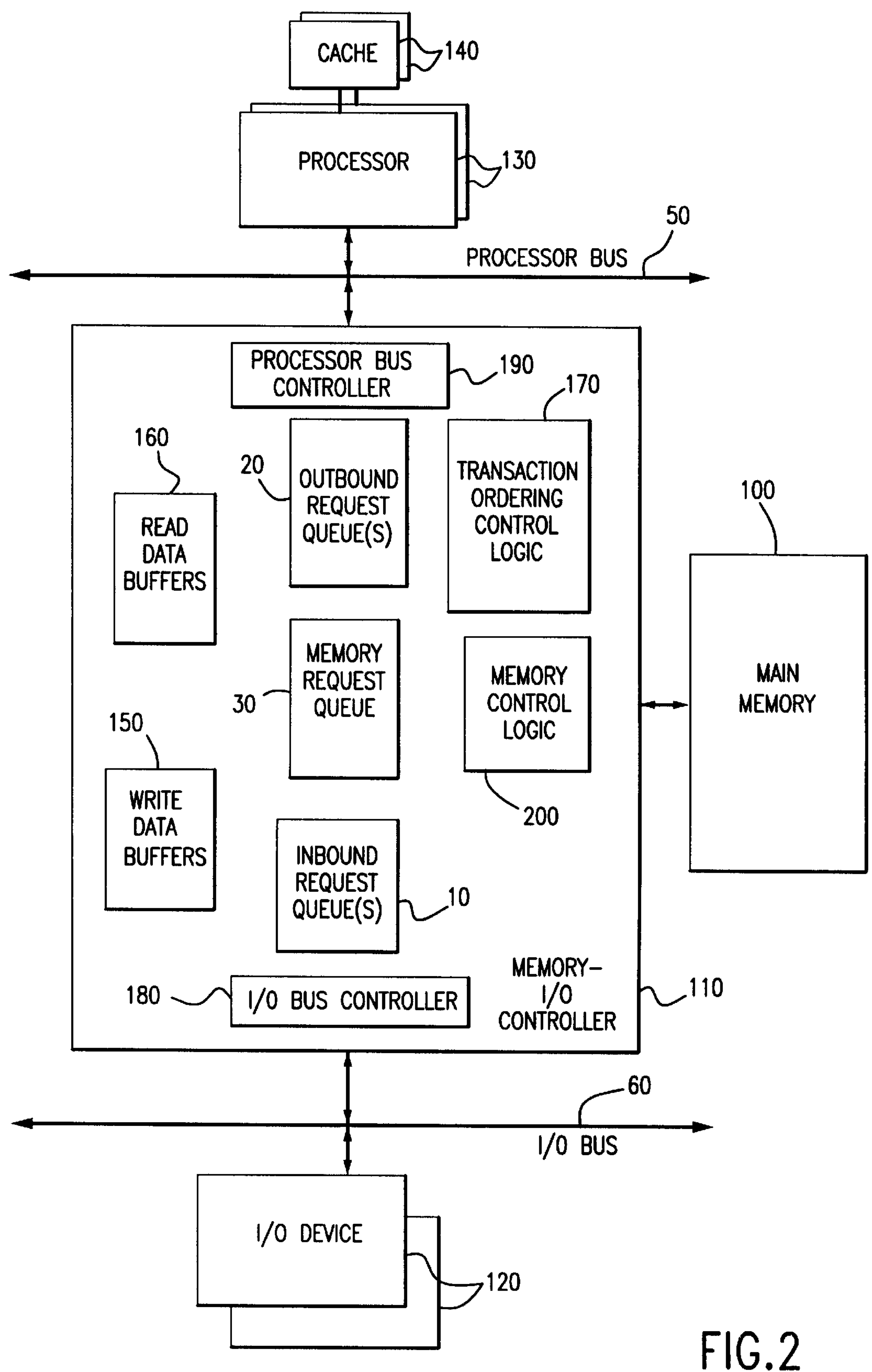
FIG. 2 depicts a system block diagram for performing transaction ordering and maintaining cache coherence according to an embodiment of the present invention.

FIG. 2 depicts a system block diagram for performing transaction ordering and maintaining cache coherence according to an embodiment of the present invention. The inbound request queue I/O, outbound request queue 20 and memory transaction queue 30 are implemented, according to one embodiment of the present invention, in banks of hardware registers within the memory-I/O controller 110. Similarly, read data buffers 160 and write data buffers 150 are implemented in hardware registers within the memory-I/O controller 110. The read and write data buffers 160, 150 are used to store the data for read and write transactions, while the transaction queues are used to store transaction control information, such as, e.g., the transaction type and the address (in main memory 100 or I/O 120) targeted by the transaction.

A processor bus controller 190 and I/O bus controller 180 within the memory-I/O controller 110 control arbitration, etc. of the processor bus 50 and I/O bus 60, respectively. One or more processors 130, with corresponding cache memory 140, are coupled to the processor bus 50, while one or more I/O devices 120 are coupled to the I/O bus 60. As discussed above, the cache memory 140 can be, e.g., writeback cache memory or writethrough cache memory.

While the embodiments of the present invention discussed above include a single inbound request queue 10 and outbound request queue 20, the present invention may be utilized in conjunction with a plurality of inbound request queues 10 and outbound request queues 20, as is indicated in FIGS. 1, 2. In an alternative embodiment of the present invention, then, a separate inbound request queue 10 and outbound request queue 20 pair is utilized in conjunction with each I/O bus 60. In this embodiment, as transactions reach the top of their respective inbound request queues 10, they are serviced on the processor bus 50 on a first-come, first-served basis, if possible, and, where a "tie" occurs, they are serviced according to a "round robin" or other fair arbitration scheme. No similar arbitration scheme is necessary for transactions in the various outbound request queues 20, of course, since each I/O bus 60 in this alternative embodiment has an associated, dedicated outbound request queue 20.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method for transaction ordering in a processor-based computing system having an inbound request queue, an outbound request queue, a memory request queue, a processor bus and an I/O bus, the method comprising the steps of:

(A) placing I/O to memory transactions and processor to memory transactions in the memory request queue in the order in which these transactions appear on the processor bus;

(B) placing I/O to memory transactions in the inbound request queue in the order these transactions appear on the I/O bus; and (C) placing completions corresponding to I/O to memory read transactions and processor to I/O transactions in the outbound request queue in the order the I/O to memory read transactions and the processor to I/O transactions appear on the processor bus.

2. The method according to claim 1 wherein the processor-based computing system has a processor with cache memory, further comprising the step of:

(D) for each I/O to memory transaction, triggering snooping of the transaction by the cache memory while the transaction appears on the processor bus.

3. The method according to claim 1 wherein the processor-based computing system has a processor with writeback cache memory, further comprising the steps of:

(D) for each I/O to memory read transaction, triggering snooping of the transaction by the cache memory while the transaction appears on the processor bus and, if a cache line hit occurs, forwarding the data in the cache line to the main memory and to the I/O.

4. The method according to claim 1 wherein the processor-based computing system has a processor with writeback cache memory, further comprising the steps of:

(D) for each I/O to memory write transaction, triggering snooping of the transaction by the cache memory while the transaction appears on the processor bus and, if a cache line hit occurs, initiating a writeback of the data in the cache line to the main memory prior to executing the I/O to memory write transaction.

5. The method according to claim 1 wherein some I/O to memory read transactions target a plurality of memory lines, further comprising the step of:

(D) for each I/O to memory read transaction which targets a plurality of memory lines, (1) generating a corresponding plurality of line read transactions, (2) triggering a snoop of each of the plurality of line read transactions on the processor bus, and (3) placing each line read transaction into the memory request queue in the order in which it appeared on the processor bus.

6. The method according to claim 1, wherein the inbound request queue is a FIFO.

7. The method according to claim 1, wherein the outbound request queue is a FIFO.

8. The method according to claim 1, wherein the processor bus and the I/O bus are split-transaction buses.

9. In a processor-based computing system, an apparatus for ordering I/O to memory transactions relative to processor to memory transactions and processor to I/O transactions, the I/O to memory transactions including I/O to memory read transactions, each having an associated completion, the apparatus comprising:

(A) a processor bus;

(B) an I/O bus; and (C) a memory-I/O controller coupled between the processor bus and the I/O bus, the memory-I/O controller including:

(1) an inbound request queue coupled between the I/O bus and the processor bus;

(2) an outbound request queue coupled between the processor bus and the I/O bus;

(3) a memory request queue, coupled to the processor bus; and (4) a transaction ordering flow controller, coupled to the processor bus, the I/O bus, the inbound request queue, the outbound request queue, and the memory request queue, which controls placement of inbound transactions in the inbound request queue in the order these transactions appear on the I/O bus, controls placement of I/O to memory and processor to memory transactions in the memory request queue in the order these transactions appear on the processor bus, and controls placement of processor to I/O transactions and completions associated with I/O to memory read transactions in the outbound queue in the order such transactions appear on the processor bus.

10. The apparatus according to claim 9, wherein the memory-I/O controller further comprises:

(5) a read data buffer coupled to the processor bus and the I/O bus; and (6) a write data buffer coupled to the processor bus and the I/O bus.

11. A method for transaction ordering in a processor-based computing system having a first and a second inbound request queue, a first and a second outbound request queue, a memory request queue, a processor bus and a first and a second I/O bus, the method comprising the steps of:

(A) placing I/O to memory transactions and processor to memory transactions in the memory request queue in the order in which these transactions appear on the processor bus;

(B) placing I/O to memory transactions originating on the first I/O bus in the first inbound request queue in the order these transactions appear on the first I/O bus; and (C) placing I/O to memory transactions originating on the second I/O bus in the second inbound request queue in the order these transactions appear on the second I/O bus; and (D) placing completions corresponding to I/O to memory read transactions originating on the first I/O bus and processor to I/O transactions targeting the first I/O bus in the first outbound request queue in the order these I/O to memory read transactions and processor to I/O transactions appear on the processor bus;

(E) placing completions corresponding to I/O to memory read transactions originating on the second I/O bus and processor to I/O transactions targeting the second I/O bus in the second outbound request queue in the order these I/O to memory read transactions and processor to I/O transactions appear on the processor bus; and (F) placing I/O to memory transactions from the first inbound request queue and from the second inbound request queue on the processor bus in the order these transactions reach the top of their respective inbound request queues, and, in the event of a tie, determining placement of these transactions on the processor bus by using a round robin scheme or other fair arbitration scheme.

12. A method for transaction ordering in a processor-based computing system having an inbound request queue, an outbound request queue, a memory request queue, a processor bus and an I/O bus, the method comprising the steps of:

placing I/O to memory read transactions in the inbound request queue in the order these transactions appear on the I/O bus; and placing completions corresponding to the I/O to memory read transactions in the outbound request queue in the order the I/O to memory read transactions appear on the processor bus, said completions maintaining the proper ordering of responses to the I/O to memory read transactions with respect to other outbound transactions.

13. The method of claim 12 and further comprising the steps of:

waiting for the data requested by the I/O to memory read transaction to be returned;

updating a status of the completion in the outbound request queue to indicate that the requested data has been returned; and outputting the returned data onto an I/O bus if the status of the completion indicates that the data has been returned.

14. The method of claim 13 wherein said step of outputting comprises the step of outputting the returned data onto an I/O bus if the status of the completion indicates that the data has been returned and after the completion reaches the front of the outbound request queue.

15. The method of claim 13 wherein said step of updating comprises the step of updating a status of the completion in the outbound request queue to indicate that the requested data has been returned only after all line reads required for the read transaction have been performed.

* * * * *

UNITED STATES PATENT AND TRADEMARK OFFICE

CERTIFICATE OF CORRECTION

PATENT NO. : 5,905,876
DATED : May 18, 1999
INVENTOR(S) : Stephen S. Pawlowski, et al It is certified that error appears in the above-identified patent and that said Letters Patent is hereby corrected as shown below:

| | |
|---|---|
| Column 1, line 62 | "represent" should be --represents-- |
| Column 2, line 19 | "systems---thereby" should be --systems - thereby-- |
| Column 2, line 21 | "processing---while" should be --processing - while-- |
| Column 3, line 14 | "multiple,," should be --multiple,-- |
| Column 4, line 20 | "are allowed" should be --is allowed-- |
| Column 5, line 33 | "queue I/O" should be --queue 10-- |

Signed and Sealed this

Twenty-fifth Day of April, 2000

*Attest:*

Q. TODD DICKINSON

*Attesting Officer*

*Director of Patents and Trademarks*